May 13, 1924.

A. McDANNOLD

SAFETY SWITCH FOR TRACTORS

Filed June 29, 1921

1,493,556

Inventor:
Alexander McDannold
By Harry A. Beim
Attorney.

Patented May 13, 1924.

1,493,556

UNITED STATES PATENT OFFICE.

ALEXANDER McDANNOLD, OF ST. LOUIS, MISSOURI.

SAFETY SWITCH FOR TRACTORS.

Application filed June 29, 1921. Serial No. 481,373.

*To all whom it may concern:*

Be it known that I, ALEXANDER McDAN-NOLD, a citizen of the United States, residing at St. Louis, State of Missouri, have invented certain new and useful Improvements in Safety Switches for Tractors, of which the following is a specification.

The present invention is directed to improvements in safety switches for the ignition system of internal combustion engines as applied to self-propelled vehicles generally, but tractors more particularly, the object of the invention being to stop the engine or motor under conditions when for any reason there is danger of the tractor rearing and turning over about the axis of the rear wheels. It is well known that where a plow is attached to a tractor and the plowshare encounters a stump or other obstruction which suddenly arrests the forward travel of the vehicle, the continued operation of the driving gear will cause the body of the tractor to "wind" or rear about the axis of the rear wheels, rotation of the latter being arrested under the circumstances by the stoppage of the vehicle. In this rearing movement of the vehicle the driver often loses his head so that he fails either to stop the motor or unclutch the running gear therefrom at the critical moment and before the vehicle overturns. The result is that the driver is often injured or killed by the machine rolling on top of him. To avoid such consequences is the purpose of the present improvement, the motor being stopped by the automatic opening of the circuit leading from the coil-box to the timer and spark plugs, this automatic breaking of the circuit being accomplished by a lever operating in connection with the switch to be now described in detail in connection with the accompanying drawings, in which—

Figure 1:
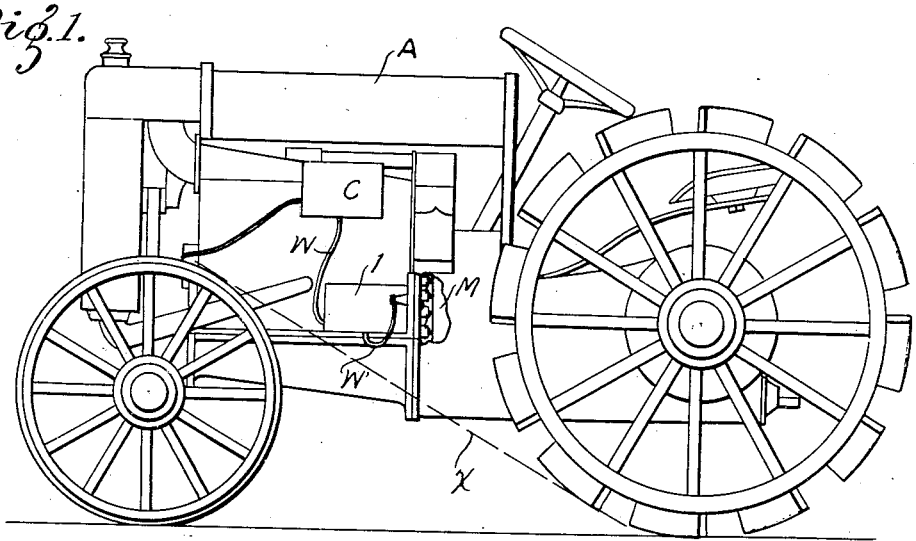
Figure 2:
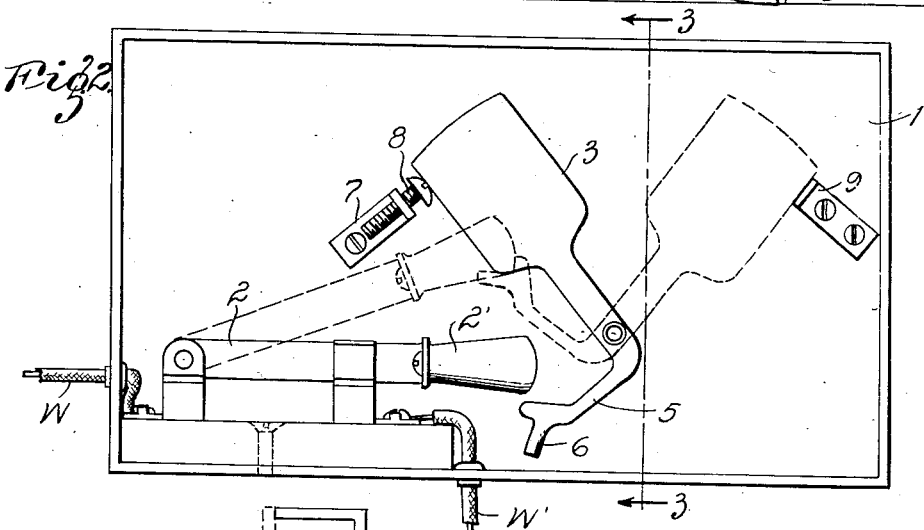
Figure 3:
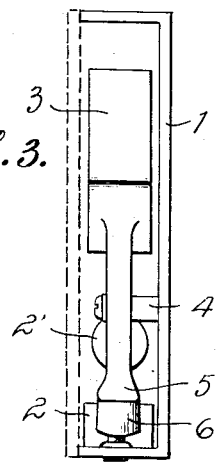
Figure 4:
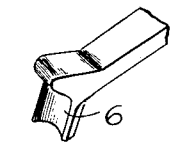

Figure 1 represents a side elevation of a tractor showing my invention applied thereto; Fig. 2 is an enlarged side elevation of the improved safety switch and lever in normal position; Fig. 3 is a vertical cross-section on the line 3—3 of Fig. 2; and Fig. 4 is a perspective view of the lever arm that disengages the switch.

Referring to the drawings, A represents a conventional tractor to which any agricultural implement such as a plow (not shown) may be attached. It frequently happens that in plowing, the shares of the plow encounter an obstruction such as a stump or rock, bringing the machine suddenly to a stop; and since under the circumstances the rear wheels of the tractor can not turn, the entire machine starts to revolve about the axis of said wheels, the front wheels leaving the ground and the entire tractor rearing so as to assume an incline as indicated by the dotted line *x* in Fig. 1. If the rearing continues the machine will simply overturn and may do serious injury to the driver unless he has presence of mind to stop the engine. By my improvement this is brought about automatically. A switch box 1 is located in the fore part of the tractor adjacent to the engine, said switch box housing a single pole knife switch 2 of ordinary construction, from one terminal of which leads a wire *w* to the coil box C, the coil box already forming a part of the ignition system of the tractor. From the other terminal of the switch 2 leads a wire *w'* to the magneto M which is also part of the ignition system. Now, it is well understood that if the ignition circuit is broken at any point the spark plugs of the engine will no longer spark, and as a result the engine will be killed. The object of the present invention as above set forth is to thus kill the engine and stop the tractor automatically should an accident resulting in the tilting upwardly of the tractor occur. The above break in the ignition system is brought about through the switch 2 by means of a weighted lever 3 pivotally mounted on a stud 4 within the switch box 1, said lever 3 having at its lower end an arm 5 bent substantially at right angles to the lever 3, and terminating when in its normal position a short distance below the switch handle 2'. Projecting outwardly from the end of the lever arm 5 is a grooved lug 6 for a purpose presently to appear. An angle bracket 7 is fixed to the rear wall of the switch box 1, and a screw 8 is threaded through the horizontal leg of said bracket, the object of the screw being to arrest the lever arm 3 and maintain the same in its normal position as shown full in Fig. 2. When the lever 3 is thus disposed the arm 5 will be spaced a short distance from the switch handle 2', the switch being closed, as is likewise the ignition circuit. However, should the tractor be obstructed as above described and rear upwardly, the lever 3 will travel through an angle to correspond with the movement of the tractor until said lever has traveled beyond its perpendicular position, at which time it will suddenly flop to its position opposite its normal position until it engages a stop 9 mounted on the rear wall of the switch box opposite to the bracket 7 (see dotted position Fig. 2). As soon as the lever 3 moves past a perpendicular position the end of the arm 5 will engage the switch handle 2', throwing the switch out and breaking the circuit, thereby automatically stopping the engine and the tractor. Obviously the switch being frictionally engaged by the switch contacts will not readily yield to the pressure exerted against it by the arm 5, consequently the end of said arm is spaced a short distance from the switch handle in order that the arm may obtain sufficient impetus to dislodge the switch. The switch once having been dislodged will be raised by the arm 5 during the entire movement of said arm until the lever 3 is arrested by the stop 9, at which time the switch is entirely clear of its contacts, as shown dotted in Fig. 2. As the lever arm 5 carries the switch upwardly the switch handle 2' will slip off the end of the lever arm 5, and will immediately be engaged by the grooved lug 6, which continues to carry the switch upwardly until the weighted lever 3 is arrested, at which time the handle 2' will be nested in the angle between the lug and the end of the arm 5. The object of thus nesting the switch handle after the switch has been thrown out its full extent is to prevent the lever 3 and the switch 2 from again accidentally assuming normal position. After the tractor has come to a stop through the operation just described, and the obstruction has been cleared away, the switch 2 will again be closed, and the lever 3 thrown over to its normal position. From the foregoing it is apparent that the tractor cannot spin around beyond a certain point as indicated by the line $x$, because the weighted lever 3 will at this point engage the switch 2 and immediately throw out said switch, thus breaking the circuit and killing the engine.

Having described my invention, I claim:

1. In combination with the ignition system of a tractor, a switch, a weighted lever pivotally mounted adjacent to the switch, said lever terminating in an arm adapted to be actuated to engage the switch and open same with a predetermined angular movement of the tractor, means for arresting the lever after said switch has been opened, and means on the aforesaid arm for preventing accidental resumption of normal position by the lever.

2. In combination with the ignition system of a tractor, a switch, a weighted lever pivotally mounted adjacent the switch and adapted to be actuated to engage said switch and open same with a predetermined angular movement of the tractor, means for arresting the lever after the switch has been opened, and means on the lever for preventing accidental resumption of normal position by said lever.

In testimony whereof I hereunto affix my signature.

ALEXANDER McDANNOLD.